Patented Apr. 29, 1952

2,595,181

UNITED STATES PATENT OFFICE 2,595,181

STOCK FOOD AND PROCESS OF MAKING SAME

Daniel B. Vincent, Tampa, Fla.

No Drawing. Application October 5, 1949, Serial No. 119,771

12 Claims. (Cl. 99—2)

This invention relates to food products and the process of making the same from citrus fruit materials, such as the waste from citrus canning plants.

One of the primary aims of the invention is the preparation of an improved food product from citrus fruit waste, such as the peel, rag or seed, or a mixture thereof which will provide a succulent feed for cattle and dairy stock.

The invention aims further to improve the product and the process described in my prior Patent No. 2,215,944, granted September 24, 1940.

Existing processes for the manufacture of stock feed from citrus waste, comprise, besides other steps, the shredding of the citrus waste and drying the waste to a condition of low moisture content so that mold, rancidity and putridity will not develop in the dried product. In prior processes it has been found necessary to dry the waste to reduce the moisture content to 10% or lower, in order effectively to prevent the development of mold, souring, and decay in the product. According to existing processes of treating waste, spoilage usually occurs after twenty-four hours, unless the material is dried to an extent of containing 10% or less of moisture.

The citrus waste material available for processing into stock feed is derived largely from citrus fruit canneries and juicing plants, which generally are located in the citrus fruit producing regions or belts, and the waste comprises the peel, rag, seed, and culls from such canning and juicing plants. The available supply of citrus fruit for such plants is widely variable, depending upon variable weather conditions controlling ripening of the fruit, and as the fruit for such plants is usually picked ripe, it must be canned or juiced quickly thereafter. This results in a widely variable supply of citrus waste.

Existing processing plants for producing stock feed from citrus waste material in which the finished product has a moisture content of 10% or less, are limited in production by the capacity of the driers used. The drying operations of such existing plants are the most expensive and time-consuming operations and therefore are the critical factors controlling the output of the waste processing plants.

The volume of citrus waste material available from the canning and juicing plants is frequently greatly in excess of the drying capacity of the feed-processing plants, with the result that such surplus frequently cannot be processed and dried before spoilage thereof occurs. Such spoiled waste must be disposed of, usually by burying it in nearby unused fields. The cost of disposing of this unusable waste is an added item in the total cost of finished feed produced, and in some instances the unusable surplus may approximate that used to produce the daily output of finished food.

Furthermore, the investment in drying equipment and the cost of drying the pressed waste according to existing processes, renders such processing too expensive for many small canneries, with the result that their citrus waste is lost as a stock feed material.

Undried freshly produced grapefruit waste material will be eaten by cattle, if unspoiled. However, undried orange waste material, produced by existing methods, is not generally palatable to cattle, particularly dairy cows, with the result that many canneries which may dispose of part of their surplus waste material to nearby dairies can sell or give away some of the grapefruit waste but find it necessary to segregate the orange and grapefruit waste in separate storage bins, so that the orange waste may be discarded separately as described above.

Prior efforts to store and preserve undried citrus waste for cattle feed have, to the best of my knowledge, been unsuccessful. These prior efforts, so far as I am aware, have been directed to the storage of green waste in a silo or like storage container, to ferment the waste to produce an ensilage, but these efforts have failed, due I believe, to conditions which stimulate organisms which form butyric acid while suppressing organisms which form lactic acid thus accelerating the formation of butyric acid and giving the product an odor similar to rancid butter. Probably there is also a growth of certain other bacteria or organism which attack the proteinacious content of the waste causing odors of a generally putrid offensive nature.

Accordingly, the invention has for one of its objects the provision of a new and improved process for quickly and economically producing a new and improved stock feed from citrus waste material, which may be preserved for a substantial period of time even though it contains a relatively high moisture content, substantially in excess of ten to fifteen percent.

A further object of the invention is the provision of an improved process for treating citrus waste material that will enable processors to store treated waste for substantial periods of time for subsequent pressing and/or drying and sale.

A further object of the invention is the provision of an improved undried feed and method of preparing it from orange waste which will be palatable to cattle and particularly dairy cows.

The present invention provides a process to eliminate the aforementioned difficulties as well as to provide a new and improved stock feed that may be economically produced and remain edible and substantially free from destructive bacteria for reasonably substantial duration of time.

These and other aims and objects of the invention will be more apparent to those skilled in the art from a consideration of the following specification, illustrating suitable stops for making the improved feed.

Broadly, the process of the invention comprises shredding and treating the waste to render it water-pressable and incorporating therein a controlled amount of a safe, edible, antiseptic compound to inhibit the growth or development of organisms such as cause souring and putrefaction in the waste. The bacteria inhibiting compound advantageously is such as will inhibit the growth and development of butyric acid bacteria and other putrefying bacteria, and should be added in a controlled amount so that, even if subsequently partially dried, the waste will retain not exceeding 0.15% by weight of inhibiting compound based on the weight of the final product. Preferably the antiseptic compound is such that it will inhibit growth of the butyric acid organism while permitting fermentation to form lactic acid when desired.

Citrus waste material, such as the by-products of citrus canning material contains peel, rag, seed, juice and considerable quantities of water. Normal waste contains from eighty to eighty-five percent moisture and when ground, comminuted or shredded, is a slick mass retaining substantially all of its water in bound-up state and flavor generally objectionable to good dairy feeding. Normally this material is not mechanically pressable to remove the water and liquids therefrom.

According to my prior process, the raw citrus waste material is first shredded, such as by grinding, crushing or comminuting, and conveniently this may be effected by any suitable means, for example by crushing and shredding rolls, or by a hammermill. It will be understood therefore that, where in the specification, and claims, the words "shredding" or "shredded" are employed they will be understood in the generic sense as covering any mechanically comminuted form such as grinding, crushing and the like in addition to actual shredding. The shredded material is a slick slippery mass which is treated to dissolve the objectionable flavors and convert it into a watery mother liquor and water-pressable solid. The reduction of the shredded alimy citrus waste into palatable water-pressable solids and a watery mother liquor may be effected by the addition of controlled amounts of a nontoxic alkaline compound, as disclosed in my prior Patent No. 2,215,944 aforesaid. Calcium hydroxide is a suitable reagent for this purpose, although any of the reagents mentioned in my prior patent aforesaid may be employed.

Also according to my prior process addition of the alkaline reagent to the shredded waste may be effected in any desired manner, for example, it may be admixed therewith either dry or in the form of a slurry in the hammermill as the waste is comminuted or shredded, or it may be added to the material in a mixing conveyor after shredding, as desired. The alkaline treated waste may then be passed to a mixing vessel, for example, a pug mill, in which the treated mass is thoroughly mixed. The separation of the waste into water-pressable solids and a mother liquor will ordinarily take place in the mixing vessel or, pug mill, after a few minutes agitation. At this stage the waste is water-pressable. The above described steps of converting the raw citrus waste into water-pressable solids may be controlled and varied considerably according to the teachings of my prior Patent No. 2,215,944.

According to my patented process referred to hereinabove, the shredded waste which has been treated to render it water-pressable, as above stated, is then passed through a suitable press to mechanically express water and liquids therefrom and to produce a press-cake. The press-cake will contain more or less water which according to my prior process, may then be removed by charging the material into suitable drying ovens in order to dehydrate the material to the desired final low moisture content. This final product is substantially dry to the feel and may be sacked or stored and shipped as desired, being very stable under practically all atmospheric conditions. Prior to the drying step, however, the moisture content of the press-cake will be found to vary depending upon the efficiency of the press and depending also upon the desires of the operator. It has been found preferable to produce a press-cake containing about 50% solids and the balance moisture and liquids. However, the press-cake may contain a considerably larger proportion of moisture and liquids or may be pressed to a relatively low moisture and liquid content. For the sake of uniformity in explaining the proportions of moisture and solids in the original material and in the press-cake, I shall refer to the components in terms of parts by weight. Remembering that the original citrus waste material contained between 80 and 85 parts by weight of moisture, the shredded water pressable material would be found to contain between 80 and 85 parts of moisture and liquids and between 20 and 15 parts of solids, the parts being expressed by weight. In the mechanical expression of some of the moisture and liquids, the preferred press-cake will contain 50 parts of moisture and liquid and 50 parts of solids. However, it is possible to remove but a small proportion of the moisture so as to leave a press-cake which contains 75 parts of moisture and liquids and 25 parts of solids; alternatively, more severe expression may be resorted to and the final product may contain 85 parts of solid and 15 parts of moisture and liquids.

According to one embodiment of the process for practicing the present invention, the shredded waste which has been treated to render it water-pressable, as above stated, and which has been passed through a suitable press, to mechanically express water and liquid therefrom, and to produce a press-cake will contain preferably, about 50 parts of solid and about 50 parts of moisture and liquids, the parts being by weight. The press-cake thus produced may be mixed with a small amount of a solution containing the inhibiting compounds which are the subject of the present invention, or alternatively, the press-cake may be re-wetted by adding 10 to 30 parts or more of liquids which have previously been expressed from a previous cycle of the process, such liquids containing appreciable amounts of the inhibiting compounds which are the subject of this invention. In this alternative procedure, the re-wetted material may then be repressed to reduce the moisture content to the desired degree, preferably to a low moisture content. In either procedure discussed immediately above, the press-cake which has been treated with the solution is desirably agitated and thoroughly mixed in the mixing vessel which may be the same or a different mixing vessel from that used in the initial stage of the process. It has been found that mixing for periods up to an hour with considerable agitation will mix the solid constituents of the waste and the antiseptic solution to the desired degree.

The efficiency of the press as well as the desires of the operator will control the amount of moisture expressed from the treated press-cake. For some purposes, a stock feed containing as high as 75 parts of moisture and liquids will be preferred by the consumer while for other purposes, particularly where the product is to be shipped for some distance, and transportation costs are an item of consideration, the treated material may have as little as 15 parts of moisture and liquids, the balance being solids. The treated material, except for the foregoing variation in moisture and liquid content, will be substantially uniform and will be composed of non-bitter, relatively soft, hygroscopic, succulent, pulpy solids of the citrus waste. This product may be kept sweet smelling and substantially free from butyric acid for periods up to four days even when subjected to relatively high temperatures as in the summer climate of Florida. This is considered a substantially stable product because such material on the farm is generally consumed within two or at most three days after purchase and because, by comparison with ordinary pressed citrus waste, having a moisture content exceeding 15 parts by weight, it has been found that mold-formation, decay and offensive odors, as well as butyric acid formation generally develop within 24 hours. While a four-day stability is adequate for nearby consumption, it has been found that where the feed is desired to be preserved for longer than four days, the treated pressed stock feed may be preserved substantially indefinitely by packaging it immediately in substantially air-tight containers or packages.

In another modification of the present process, the citrus material after having been treated, shredded and rendered water pressable, may be treated with the antiseptic solution and then charged into a storage tank or vat where it may be immersed in the liquid therein, for example, water. In the process the original material may have been mechanically pressed or the mechanical pressing step may have been dispensed with. In either event, it has been found that when the treated material, that is material treated with the antiseptic compound, is stored under water the citrus material is maintained under conditions which seem to be anaerobic and in which the lactic acid-forming bacteria are free to form lactic acid. Under water the lactic acid formation begins in a few days after storage and continues until the ultimate saturation point, with respect to lactic acidity is reached, and no further noticeable lactic formation is observed. Even in prolonged storage, under water, it has been found that the butyric acid formation is suppressed and other objectionable bacteria, including acetic acid forming bacteria seem to have been completely inactivated although the solution is probably not completely sterilized. The resulting material may be kept indefinitely if suitably covered or immersed, or it may be removed and pressed and the press-cake packaged as described above. In the foregoing process, it has been observed that the use of controlled heating of the originally treated shredded water pressable citrus material is beneficial and inoculating temperatures up to 190° F. may be employed with beneficial results.

I have found that the formation and development of butyric acid in the citrus waste, even where the waste contains substantial quantities of moisture and liquids, may be inhibited or sufficiently retarded to substantially prevent the decay and development of offensive odors, while at the same time permitting the desired lactic acid fermentation or development to take place substantially undiminished; by adding to the waste a suitable amount of antiseptic or inhibitor in a suitable solution. The antiseptic or inhibiting compounds which I prefer may be defined as non-toxic carboxylic derivatives of benzene having the formula $C_6H_4.X.COOY$, wherein X is a mono-valent radical from the group consisting of H and OH, and Y is an element from the group consisting of H, alkali metals, alkaline earth metals, and $NH_3$. More specifically, the inhibitor may be benzoic acid or a suitable salt thereof such as sodium benzoate, or salicylic acid or a suitable salt thereof, such as calcium salicylate or ammonium salicylate. Combinations of one or more of the defined inhibitors may be incorporated with beneficial results. In addition to the defined inhibitor, or mixture of inhibitors, suitable metallic salts which have been found desirable for stock feeds such as calcium lactate or calcium propionate may be incorporated. In any event, the solution which is added for the purpose of inhibiting the stock waste should contain enough of the inhibitor so that upon thorough admixture with the stock waste, and in spite of later mechanical pressing to remove moisture therefrom, there will remain in the moist citrus waste an amount of inhibitor not exceeding .15 per cent and preferably not exceeding .1 per cent of the inhibitor based upon the treated citrus waste. These percentages are in parts by weight with respect to the weight of the solids and moisture content of the stock feed.

To accomplish the desired result, which is to leave in the ultimate product the preferred and substantially critical amount of inhibiting compound, resort may be had to several alternative methods of treatment. Thus, for example, the inhibiting compound may be dissolved in a water solution and known quantities of this solution added directly to the pressable citrus waste material. It will be understood that when this expedient is used, the following step of mechanically expressing part of the moisture and liquids will remove some of the inhibiting compound in the expressed liquids. Alternatively, some of the expressed liquids may be preserved and used as recycle liquids after having added thereto controlled amounts of make-up solution containing sufficient inhibiting compound to give the desired proportion for initial treating and still leave in the finished product the desired amount of inhibiting compound. For example, a make-up solution containing 4 gallons of water and also containing 1 pound of salicylic acid and 1 pound of calcium hydroxide is a convenient amount for use in treating one ton of the shredded water pressable citrus waste. When thoroughly incorporated with the citrus waste, if, thereafter, the citrus waste is mechanically pressed to produce a stock feed containing 50 parts of moisture and liquids for each 50 parts of solid, the expressed liquid will be found to contain appreciable amounts of inhibiting material. This expressed liquid containing the inhibiting material can be used for retreatment of subsequent batches of citrus waste. It will be found that the expressed liquid containing the inhibiting material will be about two-thirds as strong, i. e., two-thirds as concentrated with respect to the inhibiting material, as was the original treating solution. Consequently, it is necessary to add sufficient salicylic acid either as such or as its calcium salt to the expressed liquid to make a solution having the desired inhibiting concentration. It will be understood that variations in the total quantities and in the concentrations may be employed within the limitations set forth in this specification.

The effectiveness of the inhibitor to retard the growth or formation of butyric acid organisms is dependent upon the extent to which it is incorporated into the solid constituents of the feed. The effectiveness may be substantially increased by heating the mass to open up the cell structure of the solid constituents and permit the absorption thereby of a greater amount of inhibitor. Such heating need be only to about 190° F. and may be effected in a steam jacketed container, or by injecting steam into the pulp mass or by other suitable heating means effective to inoculate the solid constituents with the antiseptic compound. Preferably such heating step should be applied quickly after the citrus waste mass has attained a water-pressable condition or the inhibitor incorporated therein. As soon as it reaches the desired temperature the mass is preferably pressed, while hot, in a suitable mechanical press to produce a pressed product having a moisture content preferably of about fifty percent. Such a product will resist the development of butyric acid and other acid-forming bacteria, even lactic acid, for several months, if packed while hot into tight containers.

In many citrus producing sections or localities there is a relatively constant demand by nearby dairies for citrus dairy feed, to be used relatively promptly, for example in two to four days. Accordingly, a cheap and inexpensive citrus dairy food that may be preserved for such time has an advantage over more expensive foods which may be preserved for longer times. The present invention provides such a citrus stock feed and may conveniently be produced by incorporating the bacterial antiseptic compound into the citrus waste after the alkaline compound has been added to render the solids water-pressable, for example in the lower end of the pug mill, and before the mechanical pressing thereof. In this way one of the pressing operations and the packaging operation may be dispensed with and the feed may be delivered to the dairies in bulk truck loads. Orange waste by this process has been found very palatable to dairy cows.

For long durations of preserving the pressed inactivated feed is packaged in substantially tight containers, for example, metal containers or moisture-proof paper bags or wrappings, hard pressed cakes, or pellets. Alternatively it may be baled under pressure into a firm cake and wrapped in a protective covering of burlap, cheesecloth or heavy paper suitably moisture-proofed. It is desirable to exclude air from the feed as much as possible, as when exposed to air a mold may develop on the surface of the cake after three to four days. This mold appears to develop only during extremely hot weather and to be confined to the exposed surface only, and seldom penetrates into the feed more than one inch in depth. However, since more than this amount would be used daily out of an uncovered container the slow tendency to mold growth is not a serious problem.

The pressed, treated citrus feed as above described may have a moisture content as high as seventy-five percent depending upon the efficiency of the mechanical press. In cases where it is desired to further reduce the moisture content, but when efficiency of the press does not permit such lower moisture content, the feed may be partially dried in a drier. I have found that reduction of moisture content to fifty percent in the final product by this method produces a very desirable feed in appearance and keeping qualities and furthermore enables the plant operator to double the capacity of his drying plant with very little change in machinery.

In a typical plant equipment suitable for carrying out the methods of the invention, the raw untreated citrus waste, as it comes from the canning or juicing plant is first subjected to a shredding or comminuting machine, which conveniently may be a hammer-mill. The shredded material from the shredding machine is delivered to a suitable mixing trough which may be a cut-flight conveyor in which the alkaline reagent from a suitable source is added and reacts to convert the normally slimy waste into a mother liquor and palatable water-pressable solid. The citrus material thus far processed may then be pressed mechanically in a suitable press to remove a substantial amount of the liquor therefrom.

The pressed material is then re-wetted by immersing it in water in a tank, which may be a pug mill provided with mixing blades, and to the slurry thus formed is added controlled amounts of a solution containing the inhibitor or antiseptic. It will be understood that wherever sufficient moisture or water is present, the inhibitor, as defined herein, may be added in dry form as well as in solution. The tank or pug mill may be a steam jacketed or otherwise heated mixing trough and an immersed or steam jet may be provided for heating the pulp in the presence of the inhibiting solution. The hot inoculated mass then is delivered to a mechanical press which may be the same as or similar to the previous press, and is thoroughly pressed to remove the desired quantity of liquid therefrom. The pressed material may be passed to a suitable packaging machine where it is packed into suitable air-proof bags, cans or wrappings or in pressed cakes or bales as described above.

The present invention may be incorporated into a plant constructed in accordance with the teachings of my prior Patent 2,215,944 or it may be used as an adjunct thereto. If incorporated in a plant built in accordance with the teachings of my prior patent, it has been found preferable to employ two or more sets of presses; one to express the moisture and liquids from the shredded, water-pressable citrus waste and the second press, or battery thereof, for pressing the moisture from the antiseptic treated stock feed which is the subject of the present invention. The reason for this is that in accordance with the teachings of my prior patent, the chemical treatment described in my prior patent not only serves the purpose of converting the slimy fluids into mobile easily pressable liquids, but tends to concentrate in such liquids the chemical ingredients which give citrus waste products their usually bitter taste. By using one press for expressing these liquids from the shredded, water-pressable citrus material the press fluids will contain these ingredients and the stock feed which is the subject of the present invention will be deprived of such bitter components. In such a process, if the first mechanical press or battery thereof removes sufficient moisture and liquids to leave a product containing 50 parts by weight of solids and 50 parts by weight of moisture and other liquids, the press liquors may be charged directly into a suitable recovery system for producing citrus molasses and other concentrates therefrom. In this event, if it is desired to treat the citrus waste material with the inhibiting compound, while in the presence of substantial quantities of water, a treating solution containing the inhibiting compound may be added to the press-cake produced as aforesaid and when the inhibiting compound has been thoroughly incorporated in the rewetted press-cake, this product may then be passed through a second mechanical press for the purpose of expressing the desired amount of moisture therefrom. In this event, the expressed fluids will contain very little of the bitter compounds and may be preserved and at least part thereof recirculated for the treatment of subsequent batches of press-cake in accordance with the teachings of this invention, provided that sufficient inhibiting compound is added to these recycle liquids to insure treatment with an inhibiting solution of the desired concentration. It is not necessary, however, to use two sets of presses because the inhibiting compound may be added to the original shredded, water-pressable citrus waste material before removing any moisture or liquid therefrom and the press liquors removed from the citrus material by mechanical pressing. In such an event, the press liquors will contain some of the inhibiting compound and increments of the press liquors should be diverted into a suitable vat or vessel and for use in retreatment of subsequent batches of press-cake. It will be understood that the press waters in either event already contain a desirable amount of the inhibiting or antiseptic material and that they supply the material in such quantities that only relatively small amounts of make-up solutions need be added to bring the solutions up to the desired treating strength.

Should it be desired to use a drier to reduce the moisture content of the waste below that possible by means of a particular press available, the material from the last pressing may be passed into the drier, but with such use of a drier a more economical and an equally satisfactory method permits the addition of the organism inhibitor to the waste after the initial pressing, in which case the complete inoculation of the pressed pulpy citrus waste solid is effected by the drying heat.

As stated above, many manufacturers of dried citrus feed have sporadic surpluses of citrus waste which is in excess of the capacity of their driers. The present invention provides a simple and economical method of treating and storing such surplus waste, while preserving it against decay and spoilage so that it may be subsequently pressed and sold either in moist or dried form as desired.

The new and improved food product of the present invention is characterized as composed of citrus pulp solids which are soft, hygroscopic, substantially non-bitter, succulent, containing 15 per cent or more by weight of moisture, and which are substantially stable against the development or growth of butyric acid forming organisms. At the same time, the product although antiseptic and inhibited against butyric acid forming organisms, provides a desirable environment for the activities of lactic acid forming organisms. The product may be used in its original shredded succulent form or may be pressed into cakes, may contain as much as 75 parts by weight of water for each 25 parts by weight of solids, or as little as 15 parts by weight of water for each 85 parts by weight of solids, and even though completely exposed to the atmosphere will be found to be substantially stable against decay, putrefaction and mold for about four days even under tropical or semi-tropical weather conditions. The product if packaged in air-tight containers will keep substantially indefinitely.

This application is a continuation-in-part of my co-pending application Serial No. 557,929, filed October 9, 1944, for Food Product and Process of Making Same.

While the invention has been described in detail and a number of examples shown, it is to be understood that the invention is not limited to these particular embodiments and all such changes and modifications as come within the scope of the application are embraced thereby.

I claim:

1. A method of preparing a moist, relatively stable, stock feed from citrus waste material which comprises shredding the citrus waste material and treating the shredded material with an alkaline compound to produce a mixture of a watery mother liquor and pressable pulpy solids, incorporating into the mixture a small amount of a preservative compound containing a carboxylic derivative of benzene from the group consisting of benzoic acid, salicylic acid, alkali metal salts of said acids and alkaline earth metal salts of said acids, storing the pulpy solid content of said mixture out of direct contact with the atmosphere while submerged in an aqueous body and thereafter expressing sufficient liquid from the said mixture to reduce its moisture content to between about 10% and about 75% of the mixture.

2. A method of preparing a moist, relatively stable, stock feed from citrus waste material which comprises shredding the citrus waste material and treating the shredded material with an alkaline compound to produce a mixture of a watery mother liquor and pressable pulpy solids, incorporating into the mixture a small amount, less than about .125% of the weight of said mixture of a preservative compound containing a carboxylic derivative of benzene having the formula $C_6H_4.X.COOY$, wherein X is a mono-valent radical from the group consisting of H and OH, and Y is an element from the group consisting of H, alkali metals, alkaline earth metals and $NH_3$ thereafter expressing sufficient liquid from the said mixture to reduce its moisture content to between about 10% and about 75% of the mixture.

3. A method of preparing a moist, relatively stable, stock feed from citrus waste material which comprises shredding the citrus waste material and treating the shredded material with an alkaline compound to produce a mixture of a watery mother liquor and pressable pulpy solids, incorporating into the mixture a small amount, less than about .125% of the weight of said mixture of a preservative compound containing salicylic acid, thereafter expressing sufficient liquid from the said mixture to reduce its moisture content to between about 10% and about 75% of the mixture.

4. A method of preparing a moist, relatively stable, stock feed from citrus waste material which comprises shredding the citrus waste material and treating the shredded material with an alkaline compound to produce a mixture of a watery mother liquor and pressable pulpy solids, incorporating into the mixture a small amount of a preservative compound containing salicylic acid in an amount corresponding to about 40 ounces per ton of mixture, the said amount of preservative being sufficient to inhibit decomposition by mold-forming organisms and decomposition of the solids by butyric acid-forming bacteria, yet sufficient to permit desired decomposition of the solids by lactic acid-forming bacteria, thereafter expressing sufficient liquid from the said mixture to reduce its moisture content to between about 10% and about 75% of the mixture.

5. A method of preparing a moist, relatively stable, stock feed from citrus waste material which comprises shredding the citrus waste material and treating the shredded material with an alkaline compound to produce a mixture of a watery mother liquor and pressable pulpy solids, incorporating into the mixture a small amount of a preservative compound containing salicylic acid and calcium propionate, the said amount of preservative being sufficient to inhibit decomposition by mold-forming organisms and decomposition of the solids by butyric acid-forming bacteria, yet sufficient to permit desired decomposition of the solids by lactic acid-forming bacteria, thereafter expressing sufficient liquid from the said mixture to reduce its moisture content to between about 10% and about 75% of the mixture.

6. A method of preparing a moist, relatively stable, stock feed from citrus waste material which comprises shredding the citrus waste material and treating the shredded material with an alkaline calcium compound to produce a mixture of a watery mother liquor and pressable pulpy solids, incorporating into the mixture a small amount of a preservative solution containing an alkaline hydroxide, calcium propionate and salicylic acid, the salicylic acid being added, in the said solution, to the said mixture in an amount of about 40 ounces per ton of mixture, thereafter expressing sufficient liquid from the said mixture to reduce its moisture content to between about 50% and about 75% of the mixture.

7. A stock food consisting of moist citrus waste material which is characterized by a moisture content of between about 15% and about 75% by weight of the food, the remainder being solids which are succulent, substantially non-bitter, hygroscopic and pulpy, the said stock food containing not in excess of .15% by weight of a non-toxic carboxylic derivative of benzene from the group consisting of benzoic acid, salicylic acid, and salts thereof, said stock food being further characterized by substantial absence of butyric acid formation, mold formation, and putrefaction even when exposed to the open atmosphere under high temperatures for periods of four days.

8. A stock food consisting of moist citrus waste material which is characterized by a moisture content of between about 15% and about 75% by weight of the food, the remainder being solids which are succulent, substantially non-bitter, hygroscopic and pulpy, the said stock food containing not in excess of .15% by weight of a non-toxic carboxylic derivative of benzene from the group consisting of benzoic acid and salts thereof, said stock food being further characterized by substantial absence of butyric acid formation, mold formation, and putrefaction even when exposed to the open atmosphere under high temperatures for periods of four days.

9. A stock food consisting of moist citrus waste material which is characterized by a moisture content of between about 15% and about 75% by weight of the food, the remainder being solids which are succulent, substantially non-bitter, hygroscopic and pulpy, the said stock food containing not in excess of .15% by weight of a non-toxic carboxylic derivative of benzene from the group consisting of salicylic acid and salts thereof, said stock food being further characterized by substantial absence of butyric acid formation, mold formation, and putrefaction even when exposed to the open atmosphere under high temperatures for periods of four days.

10. A stock food consisting of moist citrus waste material which is characterized by a moisture content of between about 15% and about 75% by weight of the food, the remainder being solids which are succulent, substantially non-bitter, hygroscopic and pulpy, the said stock food containing not in excess of .15% by weight of a calcium salicylate, said stock food being further characterized by substantial absence of butyric acid formation, mold formation, and putrefaction even when exposed to the open atmosphere under high temperatures for periods of four days.

11. A method of preparing a moist, relatively stable, stock feed from citrus waste material which comprises mechanically comminuting the citrus waste material and treating the comminuted material with an alkaline compound to produce a mixture of a watery mother liquor and pressably pulpy solids, expressing sufficient liquid from the said mixture to reduce its moisture content to between about 10% and about 75% of the mixture and thereafter incorporating, into the moist product thus formed, a small amount of a preservative compound containing a corboxylic derivative of benzene from the group consisting of benzoic acid, salicylic acid, alkali metal salts of said acids and alkaline earth metal salts of said acids.

12. A method of preparing a moist relatively stable stock feed from citrus waste material which comprises mechanically comminuting the citrus waste material and treating the comminuted material with an alkaline compound to produce a mixture of watery mother liquor and pressable pulpy solids and incorporating into the mixture a small amount, less than about .125% of the weight of said mixture, of a preservative compound containing a carboxylic derivative of benzene from the group consisting of benzoic acid, salicylic acid, alkali metal salts of said acids and alkaline earth metal salts of said acids.

DANIEL B. VINCENT.

REFERENCES CITED

The following references are of record in the file of this patent:

| Number | Name | Date |
|---|---|---|
| 2,215,944 | Vincent | Sept. 24, 1940 |

OTHER REFERENCES

Rector: "Scientific Preservation of Food," 1925, pages 158 and 159.